Patented Nov. 9, 1926.

1,606,249

UNITED STATES PATENT OFFICE.

PAUL KUEHN, OF DENVER, COLORADO.

PROCESS FOR RECOVERING PRECIOUS METALS.

No Drawing.  Application filed October 12, 1922.  Serial No. 594,192.

This invention relates to processes for recovering precious metals from ores and more particularly to the treatment of river silt, sedimentary deposits, and volcanic and other ashes containing precious metals in very finely divided form.

I have discovered that such material frequently contains mercury and that in treating material of the character mentioned, by ordinary amalgamating processes, the recovery of the precious metals is very low and that substantially none of the mercury content is saved. After many years of research and experimental work with such low grade materials, I have discovered that by the process hereinafter described, mercury, gold and silver may be recovered from hitherto unsuspected sources such as, certain coal ashes and even in certain soils. From the fact that a fire assay does not reveal such values, it is believed that in such material the mercury and precious metals exist in some volatile combination, so that when the material is treated in the fire, the gases or vapors containing the precious metals escape. The physical or chemical condition of these combinations with carbon, silicon, sulphur or nitrogen renders them incapable of being caught by amalgamating surfaces ordinarily used.

The present invention consists in agitating the material, ground or screened to the desired fineness and mixed with a suitable quantity of water, preferably water containing soap in weak solution, preferably by means of a current of air blown through the mass. After the thoroughly saturated material has been agitated in this manner, for a short period of time, it has been found that some changes occur, bringing the metals present into a condition in which they may be recovered by amalgamation, preferably by means of the amalgamation process described in my Patent No. 1,231,176, issued June 26, 1917, which is believed to be best suited to the recovery of precious metals in an extremely finely divided condition.

In certain cases mercury may be added to the wet material before agitation, so that the process of amalgamation occurs during the process of blowing or mechanical agitation.

It has been discovered that the air which passes through and agitates the material carries over some vapor or volatile constituents. If the material is placed in a receptacle, and a current of air, passed through the receptacle, is conducted into a second receptacle containing water and mercury, in such manner that the air current is brought into contact with the mercury, precious metals are recovered in the second receptacle and in certain cases more precious metals are found in the second receptacle than are recovered in the first receptacle. For example, in a test made with river silt, from the first receptacle there are recovered 1.20 mgs. of gold and a trace of silver, while from the second receptacle there was recovered 2.52 mgs. of gold and 1.44 mgs. of silver. The mercury with which the material is brought into contact will of course be distilled in the ordinary manner for the recovery of precious metals amalgamated therewith.

Waste of the solution is minimized and the process made substantially continuous, by withdrawing the solution from the pulp after treatment thereby and returning the solution for treatment of further quantities of material, small quantities of soap and water being added from time to time to compensate for loss by evaporation and waste and to keep the solution at the proper strength.

It will be obvious that many variations may be made in the apparatus and details of treatment without departing from the principle of this invention. I therefore wish to claim the invention broadly within the full and legitimate scope of the appended claim.

I claim:

The process of recovering precious metals from low grade ores which consists in agitating the finely divided material in the presence of soapy water with a current of air and after passing from the solution, bringing the air and matter carried thereby into contact with mercury to yield its metallic content thereto.

In testimony whereof I affix my signature.

PAUL KUEHN.